Aug. 27, 1968   R. K. DAKIN   3,398,630
NON-CONTACT TYPE OF MEASURING MICROSCOPE
Filed Nov. 23, 1964   2 Sheets-Sheet 1

POWER SOURCE

RALPH K. DAKIN
*INVENTOR*

BY Frank C. Parker

ATTORNEY

United States Patent Office 3,398,630
Patented Aug. 27, 1968

3,398,630
NON-CONTACT TYPE OF MEASURING
MICROSCOPE
Ralph K. Dakin, Pittsford, N.Y., assignor to Bausch &
Lomb Incorporated, Rochester, N.Y., a corporation of
New York
Filed Nov. 23, 1964, Ser. No. 412,919
3 Claims. (Cl. 88—14)

ABSTRACT OF THE DISCLOSURE

A non-contact type of measuring microscope having a pair of stereoviewing optical systems which form a pair of stereo images of a point in an object surface on which the systems are focused, said microscope further having a single illuminated reticle which is reflected upwardly from a lateral direction in a beam by a beam divider located across the stereo axes between said systems and said object surface to form an image of the reticle in the eyepiece focal plane of each system in coincidence with said stereo images whereupon the illuminated reticle appears to lie on said object surface.

---

The present invention relates to non-contact type of optical measuring instruments and more particularly it relates to the adaptation of microscope apparatus to the measurement of an object in two or more coordinates.

With regard to the non-contact type of optical measuring instruments, it is usual in the prior art to project an image of a scale or measuring grip by an optical system upon an object surface to be measured, the scale or grid being placed at a focal plane in said system. In the case where a depth measurement of the object along the Z coordinate is desired, a stereo-pair of optical systems having axes which converge to a point is provided, each system having a duplicate reticle mark located at a corresponding focal point in their respective systems. The stereo images of said reticle marks are projected upon an object surface whose elevation is to be determined and said surface is brought into the plane of said stereo images.

In the present invention it is proposed to avoid the use of said duplicate reticle marks and their attendant disadvantages and it is an object of the invention to provide a non-contact type of measuring microscope having a single illuminated reticle mark which is extraneous to but combined with the ordinary microscope stereo optical system and may be projected into a stereo optical system by way of a beam divider so that the mark appears as a floating object in the field of view and may be brought into coincidence by proper movement along the Z coordinate with a surface of the object to be examined.

It is a further object to provide such a device in which said reticle mark is actually a measuring device and has one or more functional forms such as a scale, for instance, the image of the scale appearing as a bright object lying on a surface to be measured in X and Y coordinates, the image being changeable quickly to other forms to measure in the Z coordinate if desired.

A still further object of the present invention is to provide such a device in the form of a unitary attachment by which an easy and relatively quick conversion of standard microscopes is afforded featuring complete adaptability to a wide variety of different measuring problems, the mechanism involved being compact, simple and sturdy in construction as well as accurate and reliable in performance.

Further objects and advantages will be apparent in the combination and arrangement of the details of construction of the present invention, reference being had to the following description taken in connection with the accompanying drawings, in which.

Figure 1:
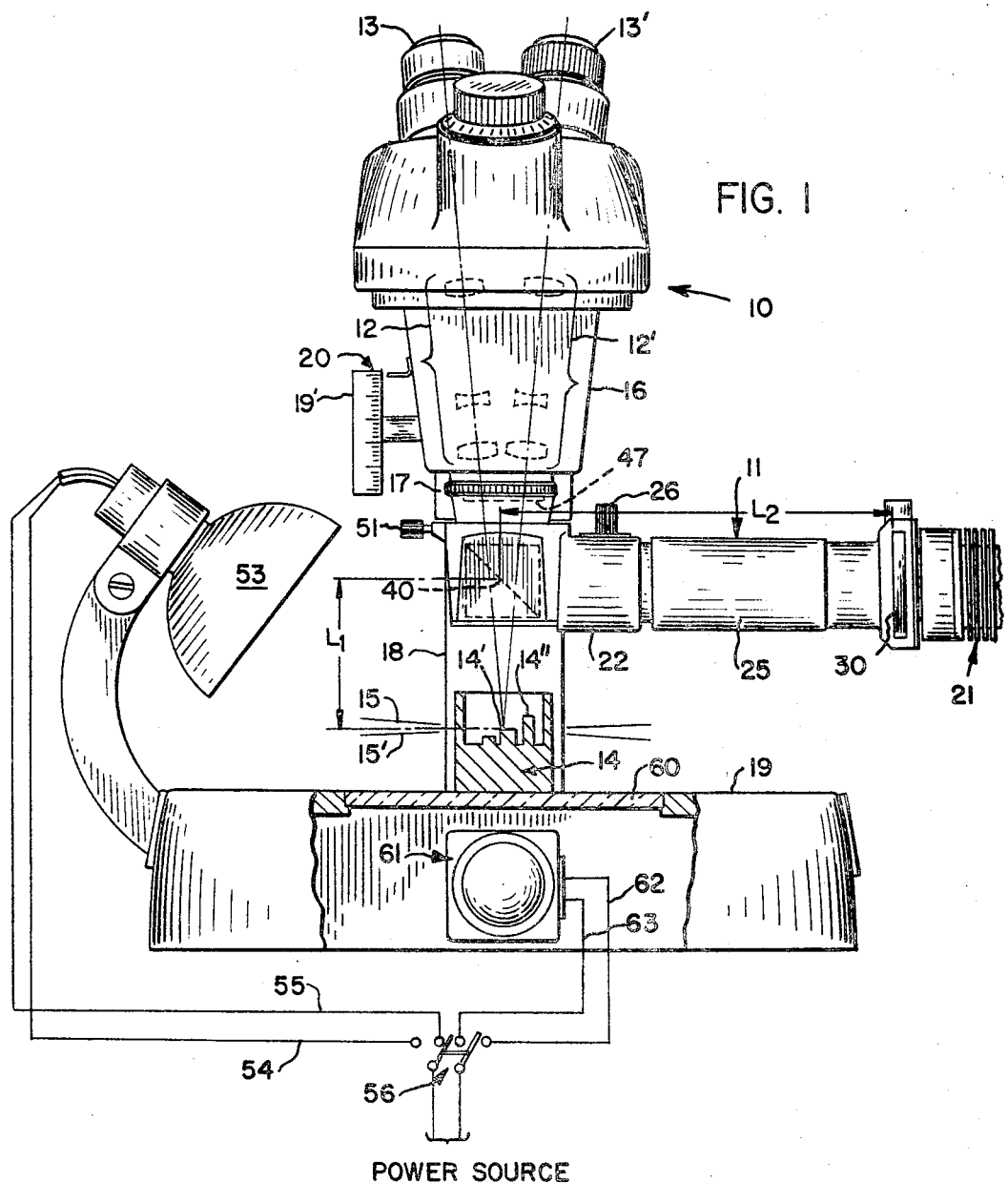
FIG. 1 is a front view generally showing a stereomicroscope reticle unit combination drawn at reduced scale showing one form of the present invention set up for one typical measuring problem.
Figure 2:
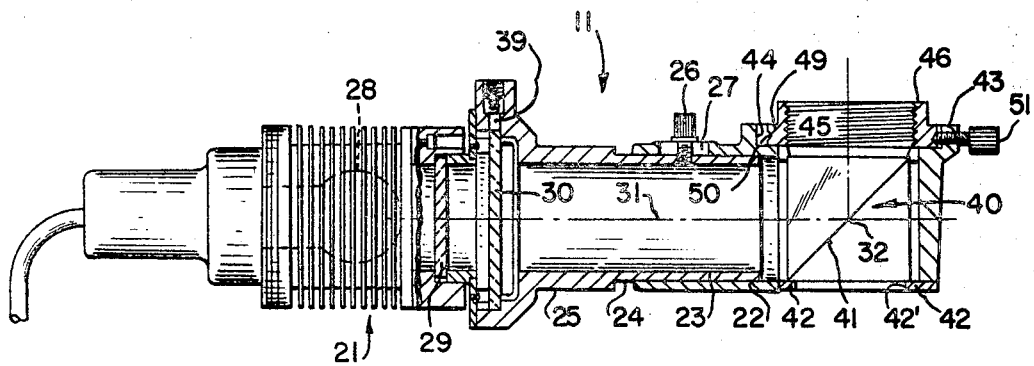
FIG. 2 is a side elevation of said reticle unit shown partly in section and broken away.

A particularly successful form of the present invention is shown in FIG. 1 which illustrates the novel combination of a stereomicroscope which is generally designated by numeral 10, and the illuminated reticle unit which is readily demountable therefrom and is designated generally by numeral 11 per se in FIG. 2.

With regard to the microscope 10, a stereoscopic form of instrument is there shown and it is described herebelow although the depth measuring capability is not needed when all measurements are performed along the X and Y axes, and under such circumstances a monocular instrument is sufficient.

As shown in FIG. 1, stereomocroscope 10 comprises an optical system having a pair of stereo lens system designated 12 and 12' which incorporate a pair of eyepieces 13 and 13' so as to form stereo images of a workpiece 14 having an object surface 14' lying in the region of focus of the object planes 15, 15' of the stereo optical systems. Both of the stereo lens systems 12, 12' are housed and held in mutual alignment by a casing 16. Said casing is fixed to a slide member 17 which is movably mounted on a vertical arm 18, said arm being suitably fixed to a base having a flat working surface 19. Motion of the slide member 17 along arm 18 is provided by any preferred means such as an operating knob 19' which is operatively connected by suitable gearing, not shown, to said arm and slide. A suitable scale mechanism generally indicated by numeral 20 is carried by the coarse and/or fine adjustments of the microscope to indicate the amount of vertical movement of said stereo lens system 12, 12' during adjustment thereof.

According to the present invention, a measuring reticle unit generally designated by numeral 11 and shown in detail in FIG. 2 is provided which per se provides linear measurements along lateral X and Y axes in the plane of the object and together with scale mechanism 20 measures the linear displacement of the focal plane 15 along the Z or vertical axis. As aforesaid, the invention embraces the combination of the microscope 10 and said reticle unit 11 which cooperatively provide the linear measurements on X, Y and Z axes.

The reticle unit 11 in one form of the invention comprises an elongated tube 22 having an elongated cylindrical mounting bore 23 formed in the end thereof. Slidably telescoped within said bore 23 is a cylindrical mounting surface 24 formed on a lamphouse sleeve 25 and held therein by a set screw 26 which is threaded into the inner tube 25 and extends freely through an elongated slot 27 therein. On the lamphouse sleeve 25 is supported a lamphouse 21.

The lamphouse 21 per se may be of any preferred form of construction so long as the solid angular aperture and brightness of the illuminating beam projected by the lamp have acceptable values. Comprised in said lamphouse 21 is a lamp 28 and a suitable diffuser plate 29 is secured in the lamphouse casing between the lamp 28 and the reticle plate 30 to spread the light evenly over the aperture of the microscope and the aperture of the plate 30. The reticle plate 30 is located in said reticle unit 11 at an axial distance away from the intersection point 32 along the lateral axis 31 which is substantially equal to the axial distance from the object surface 14' to the intersection point 32. In other words, the distance between object surface 14' and the eyepoint of the microscope is substantially the same as the axial distance from reticle plate 30 to said eyepoint, i.e., $L_1=L_2$ (FIG. 1).

Figure 3:
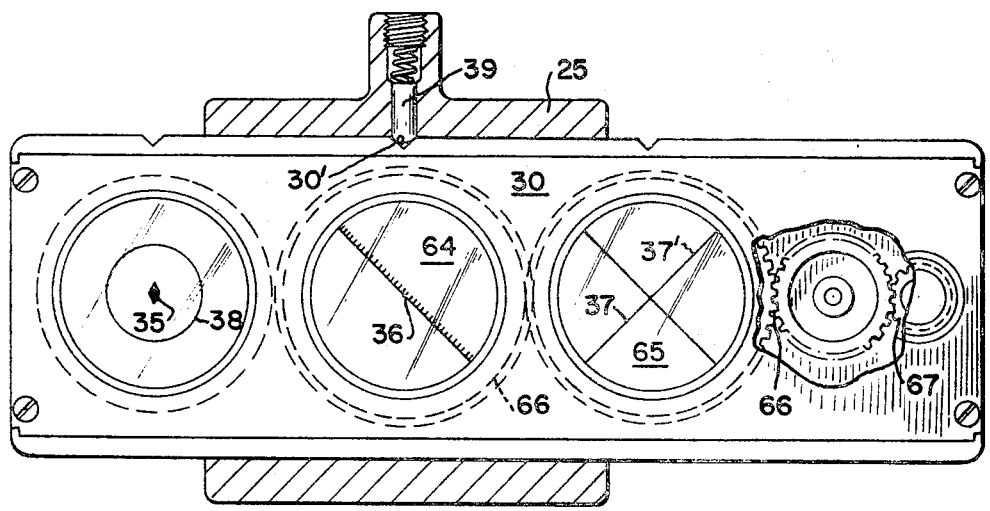
FIG. 3 is a plan view of a multiple reticle slide constituting a part of said reticle unit.

On the reticle slide 30 is formed a reticle mark 35 of any preferred shape such as a diamond shape, as shown in FIG. 3, and such a mark is particularly adaptable to determinations of depth measurements as set forth hereinafter. For other purposes, various scales, circles, crosses or other marks may be used as needed, some of which are shown in FIG. 3 at 36, 37 and 38. In the case of a multiple-reticle slide, such as shown in FIG. 3, one edge of the supporting frame may have a suitable notch 30' formed at the location of each reticle mark 35, 36, 37 wherein a spring detent 39, FIG. 2, may engage to properly locate the slide for use of any selected mark. As above noted, some reticle marks such as marks 37 and 37' as well as others are directional in character and in order to orient these marks usefully with features to be measured on the surface of the workpiece, these marks are formed on rotatably mounted transparent disks 64 and 65. The mechanism for rotatably holding the disks 64 and 65 is not shown in detail in the drawing and may be of any preferred form. Likewise, the mechanism for rotating said disks may be of any preferred kind but for purposes of illustration, rim type spur gearing 66 is shown, said gearing to be actuated by an actuating gear 67 to which a suitable actuating shaft, not shown, is fixed.

In the other end of the tube 22 a beam divider 40 is held by any preferred means such as cementing. It is advantageous and preferable to utilize a cube type beam divider as shown in FIG. 2 and in any case the beam splitting surface 41 should include the axial intersection point 32. The tube 22 is formed interiorly with mounting pads 42 whereon the beam divider cube 40 is seated and optically aligned on the axis 31 and at the bottom of the tube beneath said cube is provided an opening 42'. Formed on the upper part of the tube 22 concentrically with said cube 40 is an upstanding flange 43 having a shallow counterbore 44 therein terminating in a flat bottom surface 45.

The reticle unit 11 is secured to the under part of the microscope casing 16 solely by means of a mounting ring 46 which is threaded interiorly onto a threaded extension 47 protruding from the bottom of said casing. The mounting ring 46 is characterized by an annular flange 49, the outer diameter of which is considerably smaller than the inner diameter of the upstanding flange 43 so as to allow relative radial adjustments between the two flanges.

A demountable connection between said flanges 43 and 49 is provided in such a manner as to afford relative radial adjustments, said connection preferably constituting a peripheral V groove 50 formed in said outer diameter of flange 49. Three equally spaced clamp screws 51 are threaded radially through the upstanding flanges 43 so as to engage against the lower inclined part of said V groove 50 when the lower surface of the mounting ring 46 contacts the bottom surface 45. By use of the above-described connection the reticle unit 11 may be directed angularly as desired while being fully adjustable to secure good optical alignment of the optical members of the optical system.

In order to illuminate the surface 14' to be inspected, a lamp 53 is provided in a position above the workpiece 14, the height of the lamp being sufficient to illuminate deeply located and inaccessible surfaces 14' which are unmeasurable by direct contact. The lamp 53 is energized from a power source by an electrical circuit through leads 54 and 55 under the control of a switch 56.

With respect to measurements along a surface in the X and Y coordinates lying parallel to the stage surface 19, whether said surface is inaccessible or not, the operation is initiated by moving the slide 30 into alignment with the axis 31 as shown in FIG. 3. The lamp 28 is turned on to illuminate the scale 36, and lamp 53 is turned on by switch 56 to illuminate the surface 14' to be measured. With both lamps operating, a luminous scale appears and it is brought into apparent contact with surface 14' by rotation of knob 19'.

If it is desired to obtain measurements vertically along the Z coordinate, such as differences in elevation between surfaces 14' to 14'', the knob 19' is rotated to bring the scale 36 into coincidence with surface 14''. When the illuminated scale 36 appears to rest exactly on surface 14'', the scale means 20 indicates a new reading which is different from the original scale reading by the amount of the difference in elevation. Alternatively, the reticle mark 35 may be used solely for all vertical measurements, the shape of mark 35 being especially favorable for determining exact coincidence of the mark with the surface to be measured.

Although in the above-described use of the invention only episcopic illumination is used, other uses require diascopic illumination. To afford diascopic illumination, the microscope base 19 is provided with a glass stage plate 60 in any suitable manner, said plate preferably having a good light diffusing characteristic. A substage lamp 61 is suitably fixed to the under part of stage 19 beneath the stage plate 60 and said lamp is connected to an electrical power source by a pair of leads 62, 63 through the aforesaid switch 56 which may be for this purpose a two-way switch.

By the use of the glass stage plate 60, translucent articles may be measured by superimposing the projected illuminated reticle on either top or bottom surfaces of said article which is a great advantage in avoiding parallax in the observed image in the eyepieces 13, 13'. Furthermore, combinations of diascopic and episcopic illumination may be used simultaneously when the article to be measured is made partly of transparent material and partly of opaque material.

In the foregoing description, several forms or combinations of mechanisms have been disclosed. It is an important fact in considering these combinations that the stereo effect provided by the dual optical systems 12, 12' is not necessary when measuring only in the X and Y axes on a single surface and monocular optical systems may be used if desired. However, the dual optical systems are required to provide the stereo depth perception when it is necessary to bring the "floating" illuminated mark 35 into coincidence with any selected workpiece surface.

Although only certain forms of the present invention have been shown and described in detail, other forms are possible and changes may be made in the arrangement and form of the parts thereof and substitutions may be made without departing from the spirit of this invention as defined in the appended claims.

I claim:

1. A non-contact type of measuring stereomicroscope comprising a stereo pair of optical systems which have individual axes which converge to a point at an object surface on which said systems are focused so as to form a pair of stereo images thereof, a beam divider located inclinedly across said axes in the space between said point and said systems, an opaque reticle plate having light transmitting areas formed thereon defining a reticle, said plate facing said beam divider and said reticle being optically aligned with the divider on a lateral axis which intersects both of the first said axes, the axial distance from the plate to the beam divider being substantially equal to the axial distance from the object plane to said beam divider being substantially equal to the axial distance from the object plane to said beam divider so that the reticle is viewed stereoscopically and appears as an illuminated floating mark in the field of view of the stereo optical systems in coincidence with said object surface, and means including a light source optically aligned with said reticle for its illumination.

2. A measuring microscope as set forth in claim 1 wherein
said beam divider is formed as a cube and the beam dividing surface is a diagonal of said cube facing said optical systems and said reticle plate.

3. A non-contact type of depth measuring stereomicroscope characterized by the combination of
a stereo pair of optical systems which have individual axes which converge to a point at an object plane,
a slide member on which said optical systems are mounted,
an upright arm on which said slide member is slidably fitted,
a beam divider cube located in the space between said point and said optical systems, said cube being traversed symmetrically by said axes,
an opaque reticle plate having clear areas formed thereon defining a measuring reticle, said plate facing said cube and being optically aligned therewith on a lateral axis extending from the cube, the distance from the plate to the cube being substantially equal to the distance from the object plane to said cube so that the reticle is viewed stereoscopically,
a lamp and condenser lens means therefor optically aligned adjacent to the side of said reticle farthest from the cube on said lateral axis to illuminate said reticle,
a stage forming an element of a base for holding a three-dimensional workpiece to be measured in the field of view of said microscope,
a light transmitting stage plate fixed in said stage in an opening which is aligned with said point whereon said workpiece is supported,
a substage illuminator optically aligned for transilluminating a light-permeable workpiece,
an episcopic illuminator located above the stage for illuminating opaque workpieces,
switching means connected between a source of electrical power and both of the illuminators for selectively energizing either aforesaid illuminator,
gearing means cooperatively formed on said arm and slide member for changing the vertical distance between said point and said stage to bring the image of the reticle into coincidence with a selected level of said workpiece, and
readout scale means cooperatively formed on said arm and slide member for measuring changes in vertical positions of the slide member.

References Cited

UNITED STATES PATENTS

| | | |
|---|---|---|
| 1,949,067 | 2/1934 | Wheelock et al. |
| 2,368,434 | 1/1945 | Turrettini _____ 350—10 |
| 2,765,704 | 10/1956 | Mottu. |
| 3,023,663 | 3/1962 | Meltzer. |

FOREIGN PATENTS 1,257,537   2/1961   France.

DAVID SCHONBERG, *Primary Examiner.*

P. R. GILLIAM, *Assistant Examiner.*